United States Patent
Zimler et al.

(10) Patent No.: US 8,995,919 B2
(45) Date of Patent: Mar. 31, 2015

(54) INTERFERENCE MANAGEMENT USING OUT-OF-BAND SIGNALING

(75) Inventors: Randy Zimler, Gainesville, GA (US);
George B. Bolam, Montrose, NY (US);
James A. Worsham, Jr., Buford, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 256 days.

(21) Appl. No.: 13/327,044

(22) Filed: Dec. 15, 2011

(65) Prior Publication Data
US 2013/0157577 A1 Jun. 20, 2013

(51) Int. Cl.
*H04B 15/00* (2006.01)
*H04L 12/28* (2006.01)
*H04W 76/00* (2009.01)
*G08B 13/196* (2006.01)
*G08B 29/06* (2006.01)
*H04J 11/00* (2006.01)
*H04W 4/22* (2009.01)

(52) U.S. Cl.
CPC ........ *H04L 12/2818* (2013.01); *G08B 13/1966* (2013.01); *G08B 29/06* (2013.01); *H04J 11/0023* (2013.01); *H04L 12/2821* (2013.01); *H04W 4/22* (2013.01); *H04W 76/007* (2013.01)
USPC ......... 455/63.1; 455/68; 455/418; 455/456.1; 455/411; 455/67.13; 455/435.1; 455/445; 455/414.1; 455/410; 455/130; 370/328; 370/338; 370/335; 370/442; 370/389; 375/271; 375/259; 375/272; 375/214

(58) Field of Classification Search
USPC .................. 455/63.1, 62, 550.1, 561, 1, 41.2, 455/68–71, 562.1, 556.2, 557–558; 370/60, 370/85.4, 54, 402, 242, 16, 94, 294–295, 370/310
See application file for complete search history.

(56) References Cited

U.S. PATENT DOCUMENTS

| | | | | | |
|---|---|---|---|---|---|
| 4,792,946 | A | * | 12/1988 | Mayo | 370/245 |
| 5,196,825 | A | * | 3/1993 | Young | 340/539.11 |
| 5,461,390 | A | * | 10/1995 | Hoshen | 342/419 |
| 5,708,654 | A | * | 1/1998 | Arndt et al. | 370/242 |
| 5,732,076 | A | * | 3/1998 | Ketseoglou et al. | 370/347 |
| 5,958,010 | A | * | 9/1999 | Agarwal et al. | 709/224 |
| 5,987,524 | A | * | 11/1999 | Yoshida et al. | 709/245 |
| 7,606,534 | B2 | * | 10/2009 | Breuer et al. | 455/63.1 |
| 7,721,157 | B2 | * | 5/2010 | Spitz et al. | 714/47.2 |
| 7,756,678 | B2 | * | 7/2010 | Bonissone et al. | 702/182 |
| 8,041,347 | B2 | * | 10/2011 | Adkins | 455/416 |
| 2004/0229642 | A1 | * | 11/2004 | Derks et al. | 455/524 |
| 2007/0036111 | A1 | * | 2/2007 | Breuer et al. | 370/335 |
| 2008/0033256 | A1 | | 2/2008 | Farhan et al. | |
| 2009/0107219 | A1 | * | 4/2009 | Douglas | 73/61.63 |

(Continued)

FOREIGN PATENT DOCUMENTS

EP 2 230 820 9/2010
WO WO 2010/107565 9/2010

*Primary Examiner* — Ganiyu A Hanidu
(74) *Attorney, Agent, or Firm* — Abel Law Group, LLP

(57) ABSTRACT

In at least one embodiment, a method includes receiving a first transmission from a device, the first transmission transmitted at a first frequency. In response to receiving the first transmission, a transceiver is disabled and a second transmission is transmitted to the device, the second transmission transmitted at a second frequency. The method further includes receiving a third transmission from the device, the third transmission transmitted at the second frequency.

19 Claims, 6 Drawing Sheets

(56) References Cited

U.S. PATENT DOCUMENTS

| | | |
|---|---|---|
| 2009/0129793 A1* | 5/2009 | Milton et al. .................... 399/38 |
| 2009/0135732 A1 | 5/2009 | Maxson |
| 2009/0204265 A1* | 8/2009 | Hackett ......................... 700/284 |
| 2010/0042452 A1* | 2/2010 | Chen et al. ........................ 705/7 |
| 2010/0135238 A1* | 6/2010 | Sadri et al. .................... 370/329 |
| 2010/0233960 A1 | 9/2010 | Tucker et al. |
| 2011/0054700 A1 | 3/2011 | Chan et al. |
| 2011/0128163 A1* | 6/2011 | Gilleland et al. ............. 340/988 |
| 2012/0192014 A1* | 7/2012 | Kato ............................ 714/47.1 |
| 2012/0274859 A1* | 11/2012 | Knutson et al. ............... 348/723 |
| 2013/0005268 A1* | 1/2013 | Zhang et al. .................... 455/62 |

\* cited by examiner

US 8,995,919 B2

INTERFERENCE MANAGEMENT USING OUT-OF-BAND SIGNALING

BACKGROUND

1. Field of the Disclosure

This disclosure relates to wireless communications and more particularly to managing interference in wireless communication systems.

2. Description of the Related Art

Wireless communications are increasingly present in daily life. Devices may use multiple wireless communication protocols, frequencies, modulation techniques, error correction, and the like to communicate with wired devices and other wireless devices. Due to the ubiquity of such communication protocols, interference is often an important design consideration. In the context of the home, more and more devices and services are controlled wirelessly. Again, however, such devices can easily interfere with one another, potentially frustrating users.

SUMMARY

In at least one embodiment, a method includes receiving a first transmission from a device, the first transmission transmitted at a first frequency. In response to receiving the first transmission, a transceiver is disabled and a second transmission is transmitted to the device, the second transmission transmitted at a second frequency. The method further includes receiving a third transmission from the device, the third transmission transmitted at the second frequency.

In at least one embodiment, a method includes transmitting a request to a services controller, the request transmitted at a first frequency. The method further includes receiving a response from the services controller, the response transmitted at a second frequency, and based on the response, transmitting a message to the services controller. The message is transmitted at the second frequency.

In at least one embodiment, a system includes a receiver to communicate according to a first frequency. The system further includes a first transceiver and a second transceiver to communicate according to a second frequency. The system also includes first logic to disable the first transceiver in response to a request received at a first frequency via the receiver and further to generate a response to be transmitted at the second frequency.

BRIEF DESCRIPTION OF THE DRAWINGS

The present disclosure may be better understood, and its numerous objects, features, and advantages made apparent to those skilled in the art by referencing the accompanying drawings.

The use of the same reference symbols in different drawings indicates similar or identical items.

DESCRIPTION OF THE PREFERRED EMBODIMENT(S)

Figure 1:
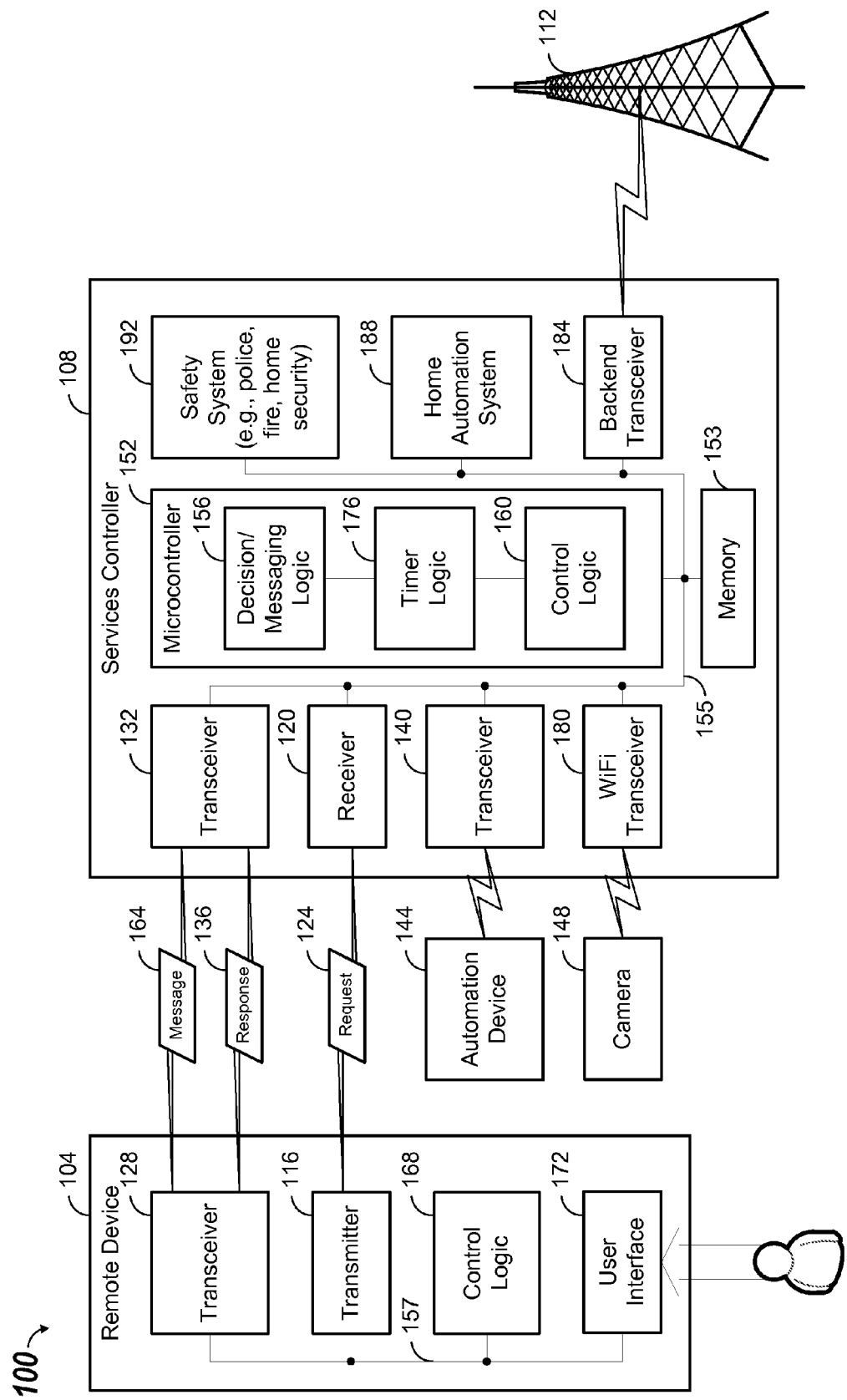
FIG. 1 is a block diagram of a system according to at least one embodiment.

Referring to FIG. 1, system 100 includes remote device 104, services controller 108, and radio tower 112. In at least one embodiment, services controller 108 is included in a home services panel that controls home security and home automation functions. For example, services controller 108 may be in communication with remote device 104 (e.g., a home safety device providing remote access to home safety and security services) via receiver 120 and via transceiver 132. Services controller may further be in communication with automation device 144 (e.g., a device configured to control home appliances, lighting, etc., using home automation system 188) via transceiver 140 and with camera 148 (e.g., a security camera) via WiFi transceiver 180. In addition, services controller 108 may be in communication with radio tower 112 (e.g., via a cellular network) using backend transceiver 184.

Because numerous communications can occur simultaneously in system 100, interference between the communications may become problematic, particularly when urgent home safety and security services are involved. As an example, transceiver 140 may communicate with automation device 144 at a frequency that can cause interference with reception of communications by transceiver 132 from transceiver 128. However, if transceiver 132 cannot successfully receive communications from remote device 104, urgent home safety and security communications may be lost.

Suppose that remote device 104 detects user input (e.g., via user interface 172) indicating a request to access a safety or security feature. In response to the user input, control logic 168 may determine that a message should be sent to services controller 108. Control logic interface with transmitter 116 via bus 157, which may couple any combination of components of remote device 104. Accordingly, transmitter 116 may transmit a first transmission, such as request 124, to receiver 120 at a first frequency.

In response to receiving request 124, services controller 108 may temporarily disable transceiver 140. For example, microcontroller 152 may detect request 124 and determine (e.g., via decision/messaging logic 156) that transceiver 140 should be temporarily disabled. To further illustrate, in at least one embodiment, transceiver 132 is configured to communicate using a second frequency, and transceiver 140 is configured to communicate using a third frequency. As will be appreciated, the second and third frequencies may be such that communications transmitted at the third frequency can cause interference with reception of communications transmitted at the second frequency. Accordingly, control logic 160 may temporarily disable transceiver 140 (e.g., by disconnecting an antenna coupled to transceiver 140) so that communications by transceiver 140 do not interfere with communications by transceiver 132. Control logic 160 may communicate with transceiver 140 via bus 155, which may couple any combination of components of services controller 108 and microcontroller 152.

In response to disabling transceiver 140, transceiver 132 may transmit a second transmission, such as response 136, to remote device 104 (e.g., via transceiver 128). In at least one embodiment, response 136 indicates that services controller 108 is ready to receive communications from remote device 104 at the second frequency. Accordingly, remote device 104 may transmit, via transceiver 128, a third transmission, such as message 164, to services controller 108. Message 164 may indicate the user-input request to access a safety feature of services controller 108 (e.g., a police, fire, or home security service).

In at least one embodiment, request 124 is associated with a one-way communication protocol (e.g., from remote device 104 to services controller 108) and response 136 and message 164 are each associated with a two-way communication protocol (e.g., from either of remote device 104 and services controller 108 to the other of remote device 104 and services controller 108).

After receiving message 164, services controller 108 may enable transceiver 140, so that transceiver 140 is able to resume communications with automation device 144. Enabling of transceiver 140 may either be in response to receiving message 164, or in response to timer logic 176 determining that a predetermined time has elapsed (e.g., since response 136 was transmitted). In at least one embodiment, timer logic 176 is configured to count to a predetermined time period after disabling transceiver 140 and is further configured to cause control logic 160 to enable transceiver 140 after the predetermined time period.

Services controller 108 may process message 164 to determine an appropriate action. For example, if message 164 indicates user input corresponding to a request to disarm a home security system, then safety system 192 (or other suitable equipment) may process the request accordingly. In at least one embodiment, if message 164 indicates user input corresponding to a panic message (e.g., a request for police, fire, or other emergency services), then operations corresponding to message 164 are given "priority" by safety system 192 over non-panic messages, such as the request to disarm the home security system.

Figure 2:
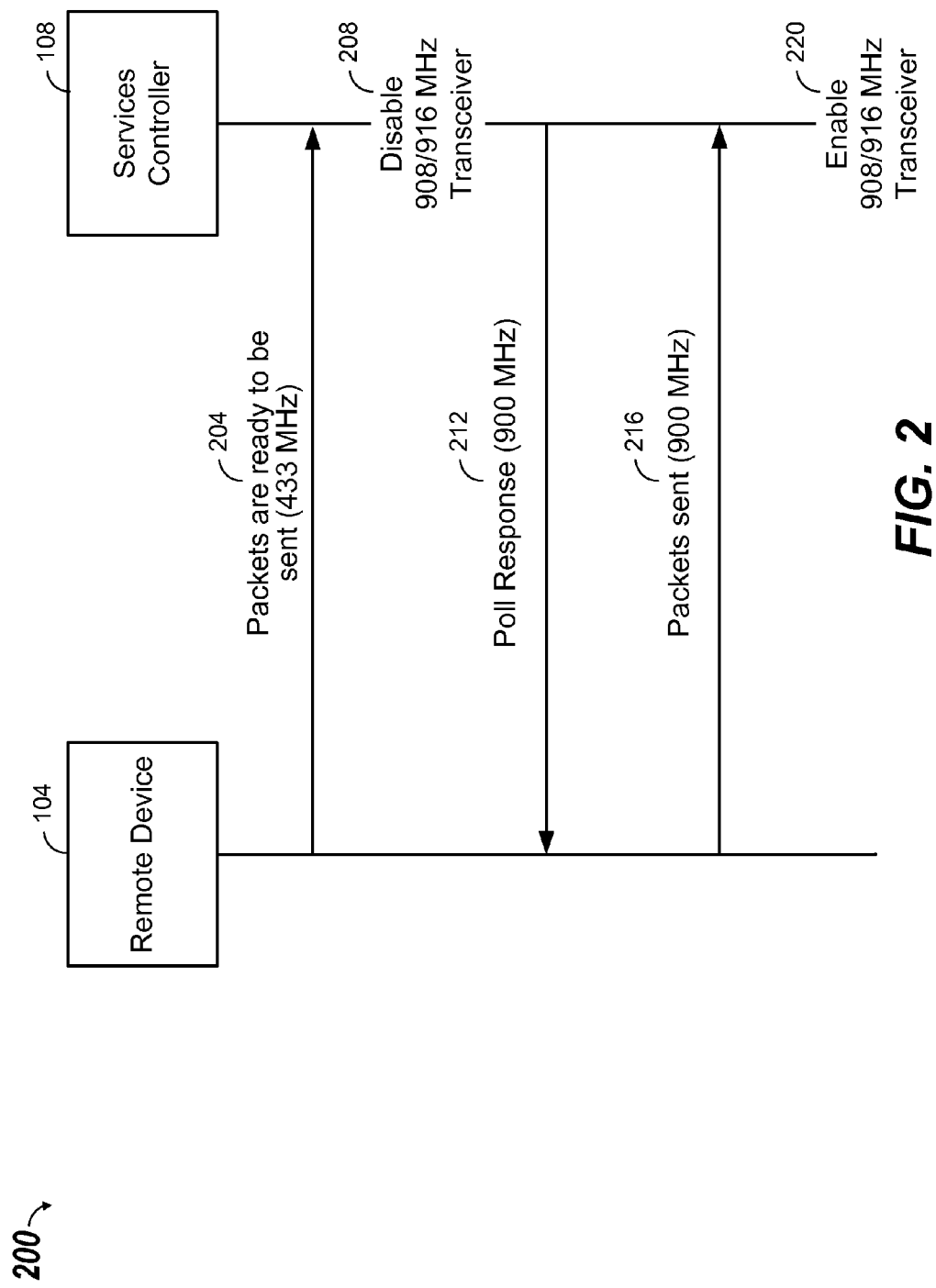
FIG. 2 is a ladder diagram according to at least one embodiment.

Referring to FIG. 2, ladder diagram 200 illustrates example communications between remote device 104 and services controller 108. In at least one embodiment, ladder diagram 200 illustrates operation of system 100 of FIG. 1. In the illustrative embodiment of FIG. 2, example communication frequencies are shown (i.e., 433 MHz, 900 MHz, and 908/916 MHz), which may correspond to the first, second, and third frequencies described with reference to FIG. 1, respectively.

It should be appreciated that the example frequencies given in FIG. 2 are illustrative and that particular frequencies used in various implementations will vary with the given application. For example, in at least one embodiment, suitable frequencies can be selected from the industrial, scientific and medical (ISM) frequency band centered at 915 MHz (i.e., approximately 902-928 MHz), of which 908 and 916 MHz are examples. Other frequencies can be selected by those of skill in the art depending on design criteria, types and sources of interference, device size, power consumption, legal regulations, and other factors.

As shown in FIG. 2, remote device 104 may indicate, at 204, to services controller 108 that packets are ready to be sent. In at least one embodiment, the indication is transmitted at a frequency of 433 MHz. In response to receiving the indication from the remote device 104, services controller 108 may disable, at 208, a transceiver. In at least one embodiment, the transceiver is configured to communicate using frequencies in the ISM frequency band centered at 915 MHz, such as 908 and 916 MHz, as depicted in FIG. 2.

After disabling the transceiver, services controller 108 may transmit, at 212, a poll response to remote device 104. The poll response may be sent at a frequency of 900 MHz. After receiving the poll response from services controller 108, remote device 104 may send packets, at 216, e.g., at a frequency of 900 MHz. After receiving the packets from the remote device 104, services controller 108 may enable the transceiver, at 220. Although not shown in FIG. 2, acknowledged/not acknowledged (ACK/NACK) messages may be employed in connection with communications between remote device 104 and services controller 108 of FIGS. 1 and 2, as well as in connection with other communications described herein.

As illustrated by the example embodiment of FIG. 2, disabling the 908/916 MHz transceiver reduces likelihood of interference during transmission of the packets sent at 900 MHz. As a result, communications from remote device 104 (e.g., a request for a police service, a fire service, a home security operation) are more likely to be received by services controller 108.

Figure 3:
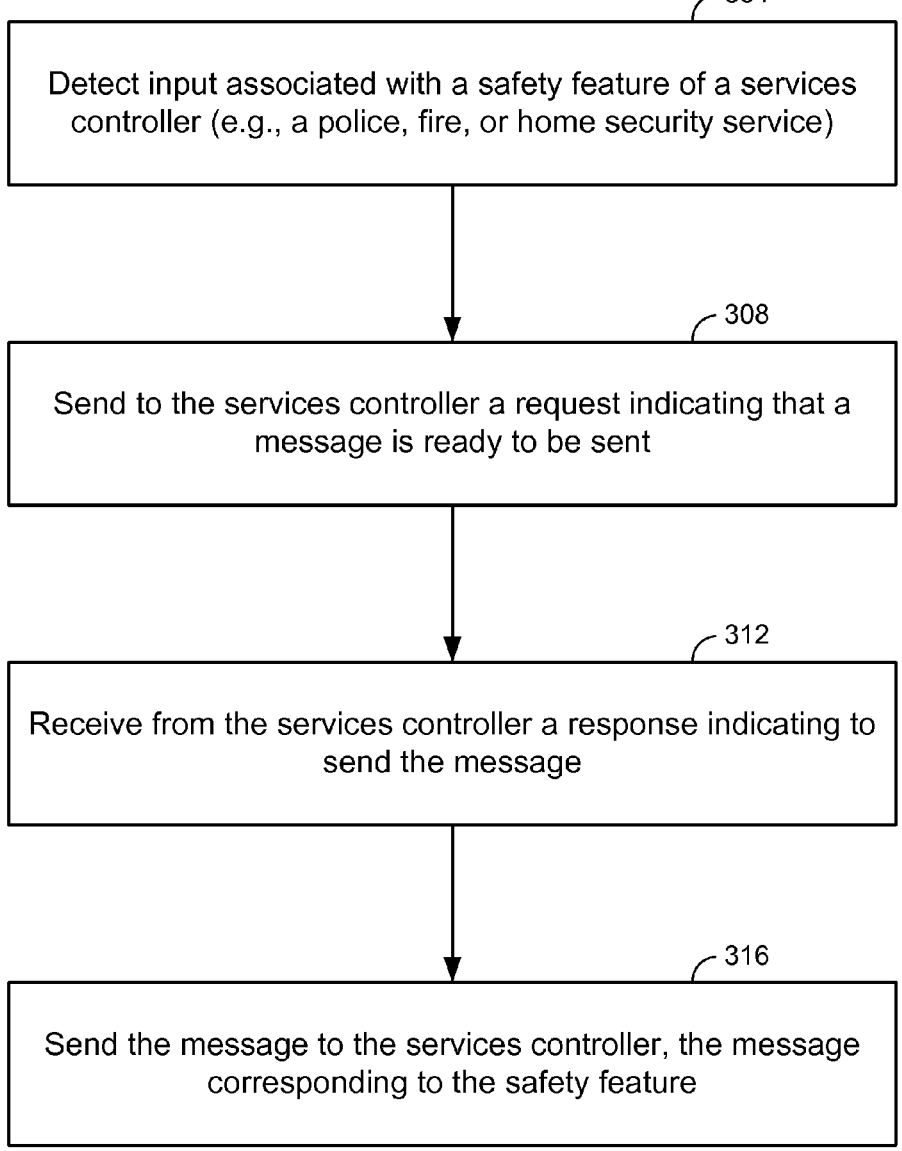
FIG. 3 is a flow diagram of an illustrative operation of a remote device according to at least one embodiment.

Referring to FIG. 3, method 300 depicts an illustrative operation of a remote device, such as remote device 104 of FIGS. 1 and 2. Method 300 includes detecting, at 304, input associated with a safety feature (e.g., a police, fire, or home security service) of a services controller, such as services controller 108 of FIGS. 1 and 2. At 308, method 300 includes sending to the services controller a request indicating that a message is ready to be sent. A response indicating to send the message is received from the services controller, at 312. Method 300 further includes sending the message to the services controller, the message corresponding to the safety feature, at 318.

Figure 4:
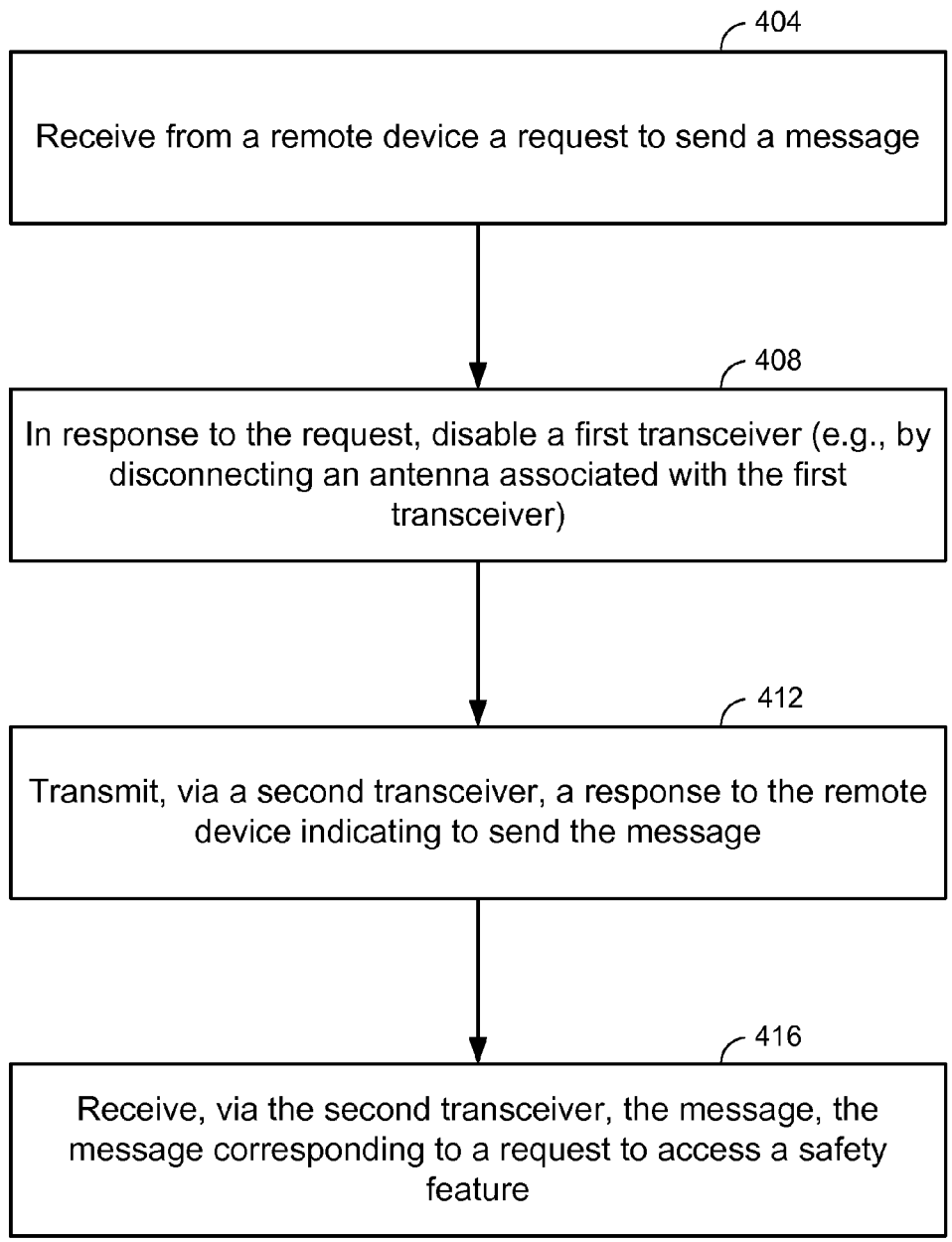
FIG. 4 is a flow diagram of an illustrative operation of a services controller according to at least one embodiment.

Referring to FIG. 4, method 400 depicts an illustrative operation of a services controller, such as services controller 108 of FIGS. 1 and 2. Method 400 includes receiving from a remote device (e.g., remote device 104 of FIGS. 1 and 2) a request to send a message, at 404. In response to the request, a first transceiver (e.g., transceiver 140 of FIG. 1) is disabled (e.g., by disconnecting an antenna associated with the first transceiver), at 408. At 412, method 400 includes transmitting, via a second transceiver (e.g., transceiver 132 of FIG. 1), a response to the remote device indicating to send the message. The message is received, via the second transceiver, at 416, the message corresponding to a request to access a safety feature.

Figure 5:
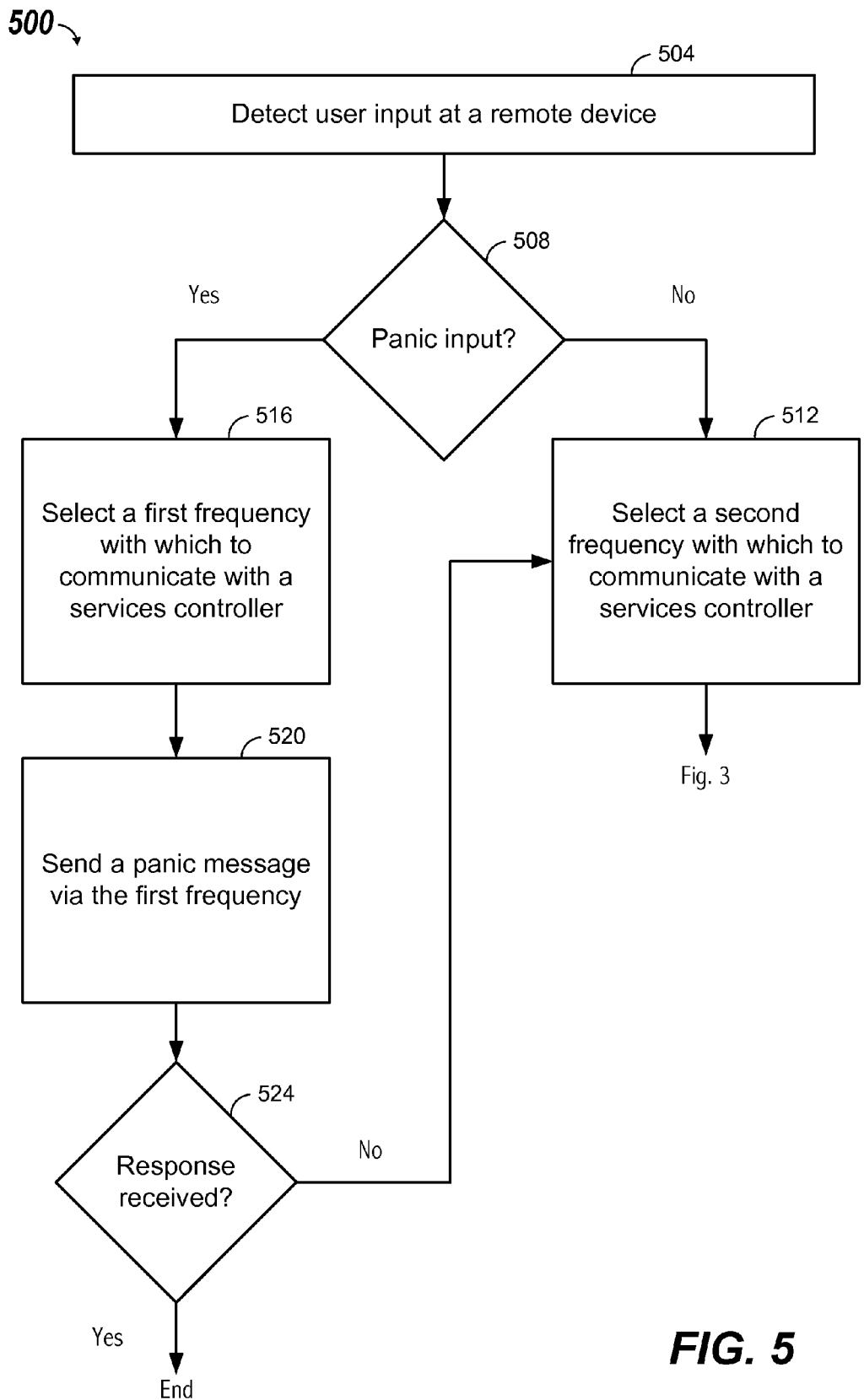
FIG. 5 is a flow diagram of an alternate illustrative operation of a remote device according to at least one embodiment.

Referring to FIG. 5, method 500 depicts an illustrative alternate operation of a remote device (e.g., remote device 104 of FIGS. 1 and 2) where panic messages (e.g., a request for police, fire, or other emergency services) may be communicated via first or second frequencies.

Method 500 includes detecting user input at a remote device, at 504. At 508, method 500 includes determining whether the user input corresponds to a panic input, such as a button or corresponding touchscreen option requesting police, fire, or emergency services. If not, method 500 continues by selecting a second frequency with which to communicate with a services controller, at 512. Method 500 may then generally follow method 300 of FIG. 3, for example by sending to the services controller a request indicating that a message is ready to be sent, receiving a response from the services controller indicating to send the message, and sending the message to the services controller.

If at 508 it is determined that the user input corresponds to a panic input, then a second frequency is selected with which to communicate with the services controller, at 516, and a panic message (e.g., a request for police, fire, or other emergency services) is sent via a first frequency, at 520. If a response is received (e.g., within a predetermined time period after sending the panic message), at 524, then method 500 terminates. Otherwise, method 500 may continue by selecting the second frequency with which to communicate with the services controller, at 512.

Figure 6:
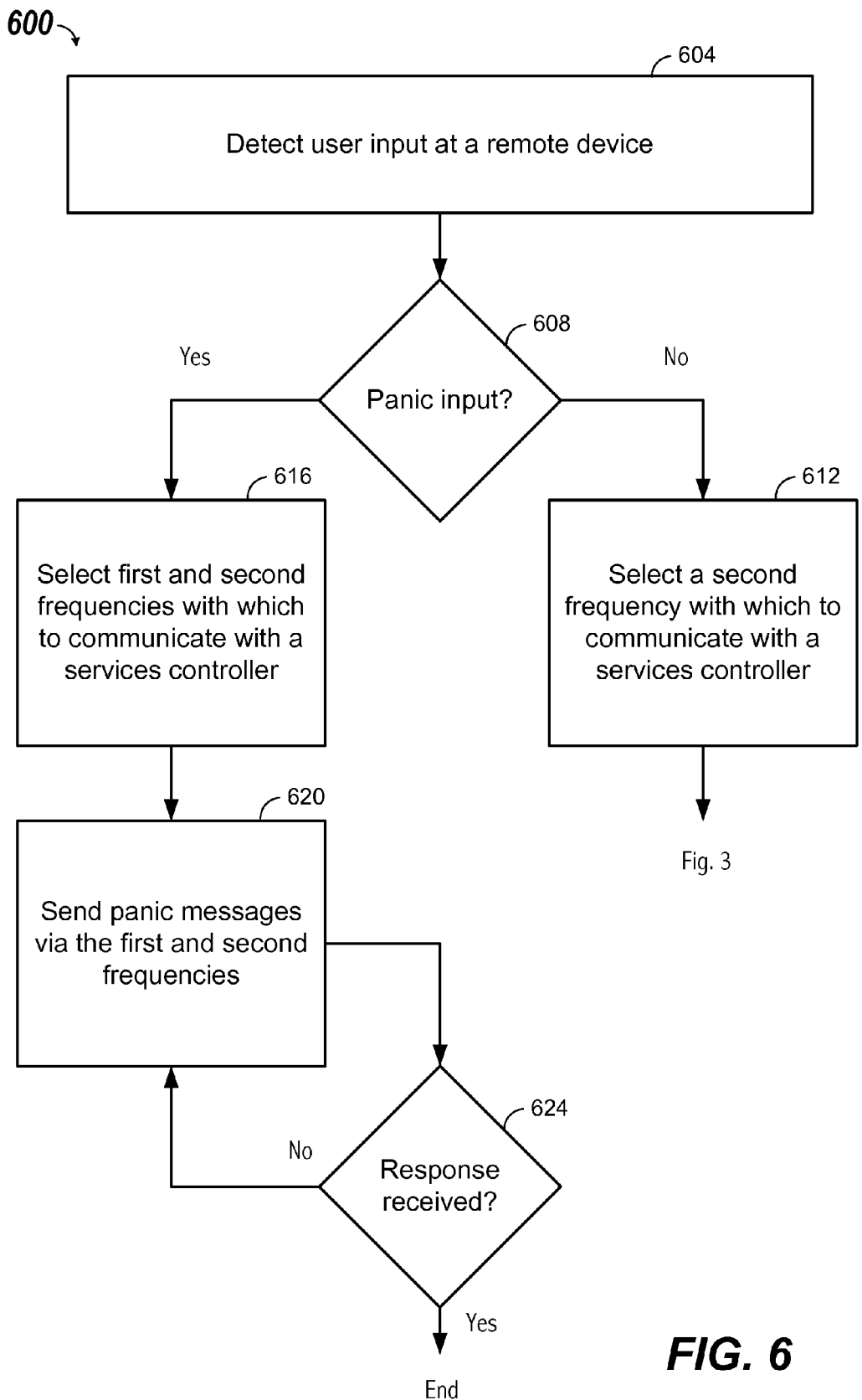
FIG. 6 is a flow diagram of another illustrative operation of a remote device according to at least one embodiment.

Referring to FIG. 6, method 600 depicts another illustrative operation of a remote device (e.g., remote device 104 of FIGS. 1 and 2) where panic messages may be communicated via first and second frequencies. Method 600 includes detecting user input at a remote device, at 604. At 608, method 600 includes determining whether the user input corresponds to a panic input. If not, method 600 continues by selecting a second frequency with which to communicate with a services controller, at 612. Method 600 may then generally follow method 300 of FIG. 3, namely by sending to the services controller a request indicating that a message is ready to be sent, receiving a response from the services controller indicating to send the message, and sending the message to the services controller.

If at 608 it is determined that the user input corresponds to a panic input, then first and second frequencies are selected with which to communicate with the services controller, at 616, and a panic message is sent via the first and second frequencies, at 620. The panic message may be transmitted simultaneously via two frequencies not likely to cause interference (e.g., 433 MHz and 900 MHz). If a response is received (e.g., within a predetermined time period after sending the panic message), at 624, then method 600 terminates. Otherwise, the panic message may be resent via the first and second frequencies, at 620, until a response is received, at 624.

As used herein, the terms "likely to cause interference with," "able to cause interference with," "can cause interference with" and the like refer to communications that one of skill in the art would recognize as prone to cause disturbance, distortion, or disruption of a particular communication. As used herein, communications likely to cause interference include communications whose effects one of skill in the art would seek to mitigate. As appreciated by those of skill in the art, such likelihood of interference generally depends on several variables, which may include any of transceiver/transmitter/receiver locations, signal amplitude, signal-to-noise ratio (SNR), and other factors that depend on the particular application at hand. One example of a communication likely to cause interference is transmission of a signal at 908 or 916 MHz during transmission of a signal between 900 to 920 MHz.

As used herein, a frequency referred to as being "approximately" 433, 908, 910, 916, or 920 MHz is a frequency that one of skill in the art would recognize as being sufficient to communicate with a corresponding receiver or transceiver or as being associated with a more precise frequency used in the art. For example, a 433 MHz communication as referenced herein may be transmitted at 433.92 MHz. Another such example is 908 MHz being approximately 908.42 MHz.

While various components have been described, it should be appreciated that suitable structures can be substituted for such components. Components herein described as a single device can be implemented using multiple discrete components, and vice versa. To illustrate, it should be appreciated that any of transmitter 116, receiver 120, and transceivers 128, 132, 140, 180, and 184 of FIG. 1 can be implemented as transceivers or as receiver/transmitter pairs. As another example, microcontroller 152 of FIG. 1 can be implemented using hardware, firmware, software, or a combination thereof.

Memory 153 of FIG. 1 may store firmware, software, or a combination thereof, usable by components of services controller 108. In at least one embodiment, remote device 104 includes such a memory in addition to a microcontroller configured to access such memory (via, e.g., bus 157). Memory 153 can store instructions, data, or a combination thereof. Memory components, such as memory 153, can be either volatile memory or nonvolatile memory, or can include both volatile and nonvolatile memory. As used herein, computer-readable storage media (e.g., memory 153) include storage media that can be accessed by a computer or processor. Computer-readable storage media can include, but are not limited to, read only memory (ROM), programmable ROM (PROM), electrically programmable ROM (EPROM), electrically erasable ROM (EEPROM), flash memory, CD-ROM, digital versatile disk (DVD), or other optical disk storage, magnetic storage including magnetic disks, or other tangible and/or non-transitory media that can be used to store desired information and can be retrieved by the processor or other component. As will be appreciated, the structures, functionalities, and operations described above with reference to FIGS. 1-6 may be implemented using standalone hardware, instructions stored at one or more computer-readable media (e.g., memory 153), or a suitable combination of hardware and software stored on one or more computer-readable media.

The description set forth herein is illustrative, and is not intended to limit the scope set forth in the following claims. Other variations and modifications of the embodiments disclosed herein may be made based on the description set forth herein, without departing from the scope and spirit of the invention as set forth in the following claims.

What is claimed is:

1. A method comprising:
receiving a first transmission transmitted at a first frequency from a first device at a second device, the first transmission being a request to transmit additional information from the first device to the second device, the additional information to be transmitted at a second frequency;
in response to receiving the first transmission, the second device disabling a transceiver configured to transmit at a third frequency, the disabling to avoid communications transmitted at the third frequency from causing interference with communications transmitted at the second frequency, and after disabling the transceiver, transmitting at the second frequency a second transmission to the first device, the second transmission indicating to the first device that the second device is ready to receive the additional information to be transmitted at the second frequency;
receiving at the second device, after receipt by the first device of the second transmission, a third transmission from the first device, the third transmission transmitted at the second frequency and including the additional information.

2. The method as recited in claim 1 wherein the request is to transmit a safety message and the additional information in the third transmission is the safety message.

3. The method as recited in claim 1 further comprising enabling the transceiver after a predetermined time period after disabling the transceiver.

4. The method as recited in claim 1 wherein the first frequency is approximately 433 megahertz (MHz), and wherein the second frequency is within a range of 900 MHz to 920 MHz.

5. The method as recited in claim 1 wherein the request is associated with a one-way communication protocol and wherein the second transmission and the third transmission are each associated with a two-way communication protocol.

6. The method as recited in claim 1 further comprising detecting user input associated with a safety function, wherein the request is a request to access the safety function, and wherein the third transmission accesses the safety function.

7. The method as recited in claim 1 wherein the first device is a home safety device.

8. A system comprising:
a first device configured to transmit a request at a first frequency, the request being to transmit additional information to be transmitted at a second frequency;
a second device including, a receiver configured to communicate at the first frequency and to receive the request;
a first transceiver configured to communicate at a third frequency;
a second transceiver configured to communicate at the second frequency;
first logic configured to disable the first transceiver in response to the request received at the first frequency via the receiver, the disabling to avoid communications transmitted at the third frequency from interfering with reception of communications transmitted at the second frequency and the first logic further configured to generate a response to be transmitted at the second frequency after disabling the first transceiver, the response indicating to the first device that the second device is ready to receive the additional information to be transmitted at the second frequency;
wherein the first device is responsive to receipt of the response transmitted from the second device, to transmit the additional information to the second device at the second frequency.

9. The system as recited in claim 8 further comprising logic to count to a predetermined time period after disabling the first transceiver, wherein the first logic is further to enable the first transceiver after the predetermined time period.

10. The system as recited in claim 8 wherein the second device is a services controller.

11. The system as recited in claim 10 wherein the first device is a home safety device comprising:
a transmitter to communicate according to the first frequency;
a third transceiver to communicate according to the second frequency; and
second logic to determine whether the home safety device should communicate with the services controller according to the first frequency or according to the second frequency.

12. The system as recited in claim 11 wherein the second logic is further to determine to communicate with the services controller using the second frequency based on the response received from the services controller transmitted at the second frequency.

13. The system as recited in claim 11 wherein the second logic is responsive to user input to generate the request.

14. The system as recited in claim 11 wherein the second logic is further to determine to use the first frequency in response to user input corresponding to a home security system access and to determine to use the second frequency in response to user input corresponding to one or more of police, fire, and emergency services.

15. The system as recited in claim 11 wherein the second logic is further to determine to use both the first frequency and the second frequency in response to user input corresponding to a panic message.

16. The system as recited in claim 11 wherein the home safety device further includes logic to generate a message for accessing a safety feature that is associated with at least one of a police service, a fire service, and a home security service.

17. A method comprising:
detecting a user input at a home safety device;
determining whether the user input is a panic input;
if the user input is determined to be a panic input, then selecting a first frequency with which to communicate with a services controller and sending a panic message corresponding to the panic input to the services controller at the first frequency;
if no response is received from the services controller responsive to the panic message sent at the first frequency, then selecting a second frequency to communicate with the service controller and transmitting the panic message at the second frequency; and
if the user input is determined not to be a panic input, then selecting the second frequency with which to communicate with the services controller.

18. The method as recited in claim 1 wherein disabling the transceiver comprises disconnecting an antenna coupled to the transceiver.

19. The method as recited in claim 1 wherein the first frequency is 433 MHz, the second frequency is 900 MHz, and the third frequency is 908 MHz or 916 MHz.

* * * * *